United States Patent
Kurihara et al.

(10) Patent No.: US 11,165,524 B2
(45) Date of Patent: *Nov. 2, 2021

(54) SOCIAL INFORMATION PROVIDING SYSTEM, SOCIAL INFORMATION DISTRIBUTION APPARATUS, AND USER TERMINAL APPARATUS

(71) Applicant: Kabushiki Kaisha Toshiba, Tokyo (JP)

(72) Inventors: Shinichi Kurihara, Yokohama Kanagawa (JP); Yuichiro Saito, Yokohama Kanagawa (JP); Kazuhisa Imura, Higashiyamato Tokyo (JP); Satoshi Yamasaki, Komae Tokyo (JP); Toshihiro Mikoshi, Yokohama Kanagawa (JP); Osamu Kobori, Fuchu Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/787,630

(22) Filed: Feb. 11, 2020

(65) Prior Publication Data

US 2020/0177294 A1 Jun. 4, 2020

Related U.S. Application Data (60) Division of application No. 15/904,216, filed on Feb. 23, 2018, now Pat. No. 10,601,531, which is a
(Continued)

(30) Foreign Application Priority Data

Jul. 31, 2013 (JP) .................................. 2013-159153

(51) Int. Cl.
*G08B 1/08* (2006.01)
*H04H 20/59* (2008.01)
(Continued)

(52) U.S. Cl.
CPC ......... *H04H 20/59* (2013.01); *G01C 21/3617* (2013.01); *G06Q 50/26* (2013.01);
(Continued)

(58) Field of Classification Search
CPC .... H04H 20/59; G01C 21/3617; G06Q 50/26; G08B 27/006; G08B 27/008;
(Continued)

(56) References Cited

U.S. PATENT DOCUMENTS 6,810,423 B1 * 10/2004 Gonno .................... H04L 29/06
709/229
8,532,607 B2 * 9/2013 Sennett .................... H04W 4/90
455/404.1
(Continued)

FOREIGN PATENT DOCUMENTS

JP 2003-348034 A 12/2003
JP 2009-021752 A 1/2009
(Continued)

OTHER PUBLICATIONS

An English translation of International Preliminary Report on Patentability issued by the International Bureau of WIPO dated Feb. 2, 2016 in the corresponding PCT/JP2013/071487—8 pages.
(Continued)

*Primary Examiner* — Zhen Y Wu
(74) *Attorney, Agent, or Firm* — Knobbe, Martens, Olson & Bear, LLP (57) ABSTRACT

According to one embodiment, a social information distribution apparatus apportions and accumulates, for items classified, basic information including a position of each of a plurality of information sources and social information transmitted in time series from each of the plurality of information sources, analyzes the accumulated social information, modifies and processes the social information,
(Continued)

updates the social information as some of the items, selects social information to be broadcast, determines a broadcast format including at least classification of broadcast ranges, a broadcasting time, and a repetition count within the broadcasting time when broadcasting the selected social information, and transmits the selected social information to a designated broadcast range by a broadcast wave.

18 Claims, 6 Drawing Sheets

Related U.S. Application Data division of application No. 15/009,716, filed on Jan. 28, 2016, now Pat. No. 9,935,725, which is a continuation of application No. PCT/JP2013/071487, filed on Aug. 8, 2013.

(51) Int. Cl.

| | | |
|---|---|---|
| *G08B 27/00* | (2006.01) | |
| *H04N 21/262* | (2011.01) | |
| *H04N 21/258* | (2011.01) | |
| *G06Q 50/26* | (2012.01) | |
| *G01C 21/36* | (2006.01) | |
| *H04N 21/81* | (2011.01) | |

(52) U.S. Cl.
CPC ......... *G08B 27/006* (2013.01); *G08B 27/008* (2013.01); *H04N 21/25841* (2013.01); *H04N 21/25883* (2013.01); *H04N 21/262* (2013.01); *H04N 21/26283* (2013.01); *H04N 21/814* (2013.01)

(58) Field of Classification Search
CPC ....... H04N 21/25841; H04N 21/25883; H04N 21/262; H04N 21/26283; H04N 21/814
USPC .................................................... 340/539.18
See application file for complete search history.

(56) References Cited

U.S. PATENT DOCUMENTS

| | | | | |
|---|---|---|---|---|
| 8,843,955 B2* | 9/2014 | Ellis | ...................... | H04N 21/454 725/32 |
| 8,850,473 B2* | 9/2014 | Sheehan | ............ | H04N 21/4622 725/35 |
| 8,880,238 B2* | 11/2014 | Reich | ................. | G01C 21/3469 701/1 |
| 8,880,337 B2* | 11/2014 | Scholl | ............... | G01C 21/3682 701/426 |
| 8,917,176 B2* | 12/2014 | Raj | ...................... | G08B 27/006 340/540 |
| 8,949,843 B2 | 2/2015 | Geraci | | |
| 9,047,649 B2* | 6/2015 | Haag | ................. | G08G 1/096775 |
| 9,459,114 B2* | 10/2016 | Saito | .................. | G01C 21/3469 |
| 9,731,618 B2* | 8/2017 | Asai | ........................ | B60L 53/14 |
| 2001/0003846 A1* | 6/2001 | Rowe | ..................... | H04H 60/71 725/47 |
| 2003/0124974 A1* | 7/2003 | Asami | .................... | H04H 60/06 455/3.02 |
| 2005/0099322 A1* | 5/2005 | Wainfan | ............... | G08G 1/0104 340/995.13 |
| 2005/0197775 A1* | 9/2005 | Smith | .................... | H04W 4/024 702/3 |
| 2009/0208313 A1* | 8/2009 | Hayashi | ................. | G06Q 10/08 414/222.02 |
| 2010/0305966 A1* | 12/2010 | Coulter | .................. | G16H 40/20 705/2 |
| 2011/0181443 A1* | 7/2011 | Gutierrez | ........... | G01C 21/3691 340/990 |
| 2012/0158229 A1* | 6/2012 | Schaefer | ................. | B60L 55/00 701/22 |
| 2013/0110934 A1* | 5/2013 | Shibuya | ................. | G06Q 50/01 709/204 |
| 2013/0157610 A1* | 6/2013 | Vainik | ..................... | H04W 4/90 455/404.1 |
| 2013/0225115 A1* | 8/2013 | Sasaki | ................. | H04M 3/5166 455/404.1 |
| 2013/0247117 A1* | 9/2013 | Yamada | ................. | G08C 17/02 725/93 |
| 2013/0344800 A1* | 12/2013 | Hua | ...................... | H04W 76/50 455/3.06 |
| 2014/0089078 A1* | 3/2014 | Dessert | .............. | G06Q 30/0238 705/14.38 |
| 2014/0200804 A1* | 7/2014 | Wippler | ............. | G01C 21/3611 701/465 |
| 2014/0205155 A1* | 7/2014 | Chung | ................... | G06Q 50/26 382/115 |
| 2015/0339866 A1* | 11/2015 | Meyer | ................. | B60L 15/2045 701/22 |
| 2016/0063771 A1* | 3/2016 | Meyer | ...................... | B60L 3/12 701/123 |

FOREIGN PATENT DOCUMENTS

| | | |
|---|---|---|
| JP | 2009-129002 A | 6/2009 |
| JP | 2011-065645 A | 3/2011 |
| JP | 2012-203595 A | 10/2012 |
| WO | WO 2012/025918 A1 | 3/2012 |
| WO | WO 2012/140486 A2 | 10/2012 |

OTHER PUBLICATIONS

D. Sakamoto, et al., "Chiiki Bosai Joho Haishin Service ni Tsuite no Kihonteki Kosatsu," Information Processing Society of Japan Dai 64 Kai (Heisei 14 Nen) Zenkoku Taikai Koen Ronbushu (4), Mar. 12, 2002, pp. 4-325 to 4-326.

First Office Action dated Aug. 2, 2016 by Japan Patent Office dated Aug. 2, 2016 in the corresponding Japanese patent application No. 2013-159153—11 pages.

International Search Report mailed by Japan Patent Office dated Sep. 3, 2013 in the corresponding PCT Application No. PCT/JP2013/071487—7 pages.

The extended European search report issued by European Patent Office dated Jul. 3, 2017 in the corresponding European patent application No. 1389032.9.

The partial supplementary European search report mailed by European Patent Office dated Mar. 17, 2017 in the corresponding European patent application No. 13890329.9.

Written Opinion mailed by Japan Patent Office dated Sep. 3, 2013 in the corresponding PCT Application No. PCT/JP2013-071487 (Japanese language only)—5 pages.

* cited by examiner

SOCIAL INFORMATION PROVIDING SYSTEM, SOCIAL INFORMATION DISTRIBUTION APPARATUS, AND USER TERMINAL APPARATUS

CROSS-REFERENCE TO RELATED APPLICATION

This application is a divisional of and claims priority to U.S. application Ser. No. 15/904,216 (now U.S. Publication No. 2018/0183534), filed Feb. 23, 2018, which is a divisional of U.S. application Ser. No. 15/009,716 (now U.S. Pat. No. 9,935,725), filed Jan. 28, 2016, which is a continuation of PCT Application No. PCT/JP2013/071487 (now WO2015/015656), filed Aug. 8, 2013, which claims the benefit of priority from Japanese Patent Application No. 2013-159153 (now JP6071792), filed Jul. 31, 2013, each of which is incorporated herein by reference in its entirety.

FIELD

Embodiments described herein relate generally to a social information providing system for providing social information to a user terminal apparatus.

BACKGROUND

These days, in various areas like transportation (roads, railways, and the like), weather (typhoons, earthquakes/tsunamis, and the like), geographical regions (rivers, seas, mountains, and the like), and facilities (parking lots, gas stations/power supply stations, and the like), various kinds of information are collected, summarized, and analyzed, and demand forecasting, circumstantial judgment and, in some case, control/guidance are performed based on an analysis result. Especially, efforts are being made to perform power demand forecasting, automatic summarization, abnormality detection, and the like by adding a communication function to each wattmeter, and collecting pieces of information about power use states at a control center via a network. These are done for the purpose of implementing demand forecasting, circumstantial judgment, and control/guidance by adding a communication function to social information collection devices such as various types of sensors and surveillance cameras to be able to readily collect more information more automatically, and performing finer-grained analysis. As a method of transferring social information or analysis information from various sensors and the like, which changes in time series, a method of opening information to the public using the Internet is the mainstream. Along with advances in mobile terminals such as smartphones, the user can acquire information away from home.

For a social information providing system in such environment, the issue is whether it is possible to timely provide pieces of social information in various areas, which change every moment, when the user needs them. Especially in case of urgent necessity, for example, at the time of a disaster, the user needs social information to immediately determine the best action to be taken at the current position, and attempts to acquire social information by accessing the Internet or the like. In reality, however, the issue that it may be impossible to acquire necessary social information because line congestion or disconnection has occurred due to the influence of a disaster or the like is assumed to arise.

As described above, the issue is whether it is possible to timely provide social information when the user needs it. In reality, however, the issue that it is impossible to acquire necessary information due to line congestion or disconnection may arise.

To solve this issue, the present invention has as its object to provide a social information providing system for distributing, for each area, social information which changes in time series so that the user can acquire and browse it in an optimum format when necessary, and a social information distribution apparatus and a user terminal apparatus therefor.

Solution to Problem

DETAILED DESCRIPTION

According to an embodiment, there is provided a social information providing system comprising a social information distribution apparatus configured to collect and analyze social information transmitted from each of a plurality of information sources, and distribute the social information over a broadcast wave, and a user terminal apparatus configured to receive and present the social information distributed from the social information distribution apparatus over the broadcast wave. The social information distribution apparatus includes basic information collection module for collecting basic information including a position of each of the plurality of information sources, accumulation module for apportioning and accumulating, for each item classified in advance, the basic information of each of the plurality of information sources collected by the basic information collection module and the social information transmitted in time series from each of the plurality of information sources, and reading out and outputting requested information, analysis module for analyzing the social information accumulated in the accumulation module in accordance with a designated purpose, modifying and processing the social information, as needed, and accumulating the social information as some of the items in the accumulation module, information transmission management module for selecting social information to be broadcast from the social information accumulated in the accumulation module, and determining a broadcast format including at least classification of broadcast ranges, a broadcasting time, and a repetition count within the broadcasting time when broadcasting the selected social information, and social information transmission module for transmitting the social information selected by the information transmission management module to a designated broadcast range over the broadcast wave in accordance with the determined broadcast format. The user terminal apparatus includes reception module for receiving the social information transmitted from the social information transmission module over the broadcast wave while the user terminal apparatus is arranged in any of the broadcast ranges, and presentation module for presenting the social information received by the reception module.

An embodiment will be described below with reference to the accompanying drawings.

A social information providing system according to the embodiment assumes that social infrastructure information and facility/equipment information are processed as social information. The social infrastructure information includes pieces of information from sensors attached to a mobile vehicle (to be referred to as a power supply vehicle) capable of supplying power to an electric vehicle, a wattmeter, a power supply station, a thermometer, a seismometer, an ombrometer, a surveillance camera, a security gate, and the like. The facility/equipment information includes pieces of information from communication devices installed in a school, a park, a hospital, an evacuation center, and the like.

In the social information providing system, at least the installation positions of social infrastructure information devices and facility/equipment information devices (to be collectively referred to as social information devices hereinafter) (information acquired by each device will be referred to as social information) are registered to collect social information acquired by each device. The collected pieces of social information are appropriately summarized and analyzed, are discriminated according to respective information areas, are optimized, and are formed into a hierarchy, as needed. The thus generated pieces of social information are extracted for each broadcast range in accordance with needs, and distributed to each broadcast range over a broadcast wave. At this time, a user terminal apparatus can acquire part or all of the social information provided in the broadcast range, and acquire and browse, in an optimum format, the social information for each area, which changes in time series, when necessary. This allows the user to collate position information of himself/herself and the social information, and determine, based on them, the best action to be taken at the current position when, for example, emergency evacuation is required at the time of a disaster.

Figure 1:
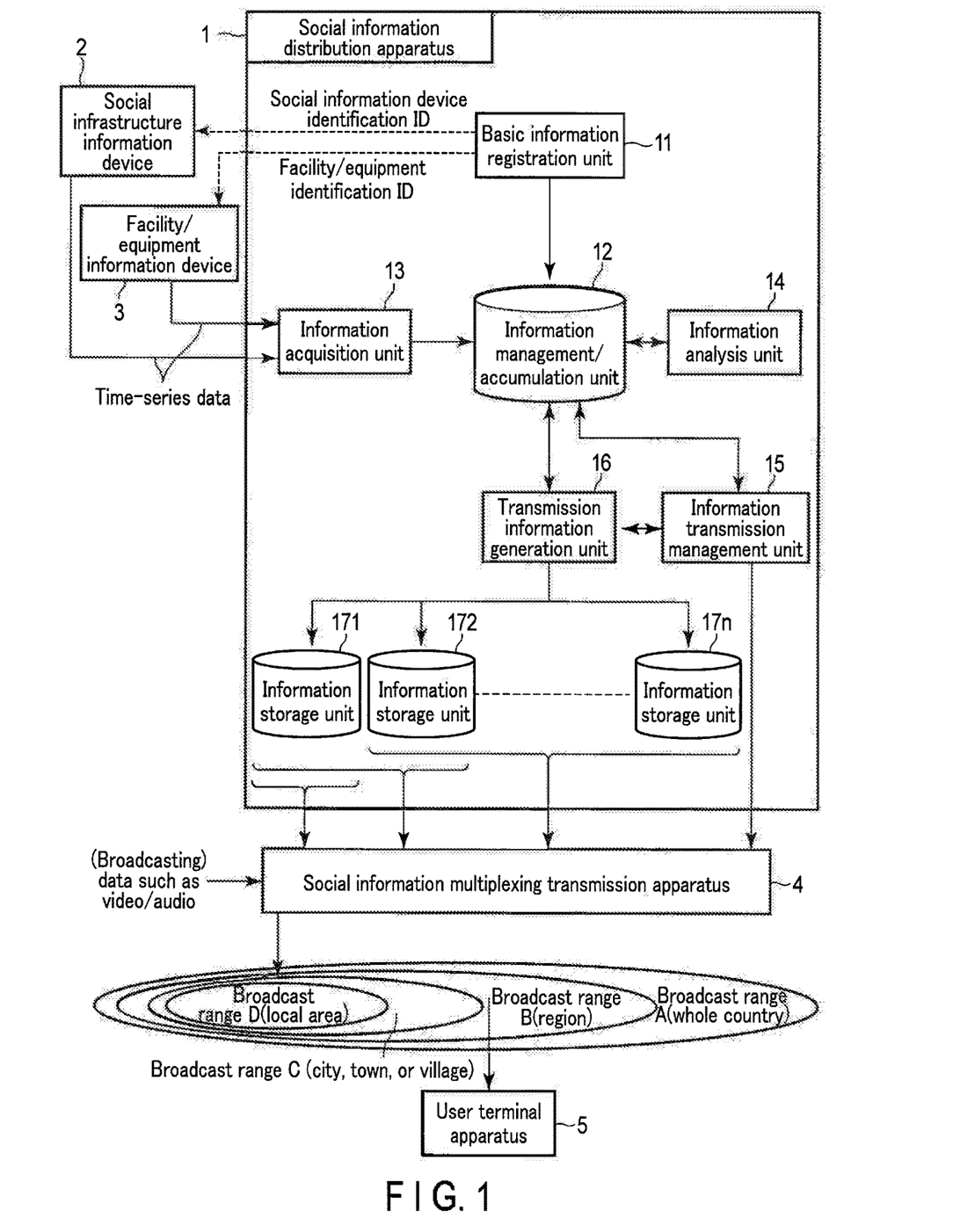
FIG. 1 is a block diagram showing the configuration of a social information providing system according to an embodiment.

FIG. 1 is a block diagram showing the configuration of a social information providing system according to this embodiment. Referring to FIG. 1, reference numeral 1 denotes a social information distribution apparatus; 2, a social infrastructure information device; 3, a facility/equipment information device; and 4, a social information multiplexing transmission apparatus. Each of the apparatus and devices has a communication function and can communicate via a network. Reference numeral 5 denotes a user terminal apparatus which exists in one of a plurality of broadcast ranges A to D classified in advance.

The social information distribution apparatus 1 includes a basic information registration unit 11, an information management/accumulation unit 12, an information acquisition unit 13, an information analysis unit 14, an information transmission management unit 15, a transmission information generation unit 16, and information storage units 171 to 17n.

To manage various kinds of social infrastructure information devices 2 and various kinds of facility/equipment information devices 3, the basic information registration unit 11 obtains pieces of basic information from the devices, and registers them in advance in the information management/accumulation unit 12. More specifically, as the basic information of each of the social infrastructure information devices 2 and facility/equipment information devices 3, position information of at least a latitude and longitude (position information example: degree, minute, second, $\frac{1}{100}$ sec, ±dd·mm, ss·sss, and the like) is saved in the information management/accumulation unit 12 in linkage with the identification ID of each of the social infrastructure information devices 2 and facility/equipment information devices 3. In registering each of the social infrastructure information devices 2 and facility/equipment information devices 3, an identification ID which is unique in at least the system is issued and saved in the information management/accumulation unit 12 together with the position information.

The issued identification ID of each of the social infrastructure information devices 2 and facility/equipment information devices 3 is set in a corresponding one of the social infrastructure information devices 2 and facility/equipment information devices 3. When transmitting time-series data to the social information distribution apparatus 1, each of the social infrastructure information devices 2 and facility/equipment information devices 3, in which the identification ID has been set, transmits the data by adding at least the identification ID to it. The identification ID is used when connecting the social infrastructure information devices 2 and facility/equipment information devices 3 to the social information distribution apparatus 1, and is preferably transmitted, as needed. In this system, by assuming that each of the social infrastructure information devices 2 and facility/equipment information devices 3 may move, information which does not change in time series, such as the identification ID of the social infrastructure information devices 2 and facility/equipment information devices 3, classification, time-series data terms, and time-series data attributes, are registered in addition to the basic position (home position) of the device.

Note that it is assumed that the basic position of each of the social infrastructure information devices 2 and facility/equipment information devices 3 is changed, and thus the position information of each device can be updated. For example, the basic positions of an AED and a fire extinguisher which can be carried, and mobile power supply vehicle, and the like are preferably registered. In addition, the positions of a wattmeter, power supply station sensor, thermometer, seismometer, ombrometer, surveillance camera, security gate, and the like which do not move basically are preferably registered.

In the case that a plurality of equipments are provided in a facility, assuming that one or a plurality of social infrastructure information devices 2 are provided in a facility, or the social infrastructure information devices 2 associated with a facility exist, they are hierarchically managed. In this case, at least the facility at the top of the hierarchy needs a facility/equipment identification ID. For example, it is preferable that in a facility designated as an emergency evacuation center, the maximum capacity, the current evacuation state, the current number of evacuees, and evacuee information, and the like are used as facility information (including time-series data), and a surveillance camera serving as the social infrastructure information device 2 installed in the facility or a surveillance camera serving as the nearby social infrastructure information device 2 belongs to the facility, thereby allowing management of time-series data (real time video) of the surveillance camera.

Upon accepting a time-series data transmission request from each of the social infrastructure information devices 2 and facility/equipment information devices 3, the information acquisition unit 13 at least performs authentication based on a social infrastructure information device identification ID in the social infrastructure information device 2 and performs authentication based on a facility/equipment identification ID in the facility/equipment information device 3, thereby accumulating time-series data in a corresponding item area of the information management/accumulation unit 12. At this time, updatable items other than information of time-series data accumulated in advance may be updated, as needed. Upon accepting the request from the facility/equipment information device 3, each item can be preferably input using a Web service or the like.

The information analysis unit 14 analyzes various kinds of social information accumulated in the information management/accumulation unit 12 in accordance with a designated purpose, adds an analysis result, and processes the accumulated information based on the analysis result, thereby accumulating resultant information in the information management/accumulation unit 12. At this time, it is preferable to accumulate more effective analysis result, prediction information, and the like in the information management/accumulation unit 12 by combining a plurality of data types.

The information transmission management unit 15 selects social information and its items to be broadcast by referring to the pieces of social information accumulated in the information management/accumulation unit 12, determines a broadcast format including at least classification of broadcast ranges (areas), a broadcasting time, and a repetition count within the broadcasting time when broadcasting the selected social information, and designates decisions and issues a broadcast request to the transmission information generation unit 16 and the social information multiplexing transmission apparatus 4.

Upon accepting the designation and request from the information transmission management unit 15, the transmission information generation unit 16 extracts corresponding social information and its items from the information management/accumulation unit 12, performs discrimination and forms a hierarchy, as needed, generates broadcasting social information in an appropriate format as broadcasting data, and stores the social information in the information storage units 171 to 17n for, for example, each of the discriminated contents for broadcast ranges. The broadcasting data preferably has, as an appropriate format, for example, a format complying with MPEG-2 System (ITU-T H.222.0|ISO/IEC 13818-1), a format complying with FLUTE (File Delivery over Unidirectional Transport (RFC 3926)), a format complying with the ARIB standard, or the like.

Upon accepting the designation and request from the information transmission management unit 15, the social information multiplexing transmission apparatus 4 selectively acquires information necessary for each broadcast range from the social information generated by the transmission information generation unit 16, performs multiplexing by including content information such as video data and audio data, as needed, performs discrimination and forms a hierarchy, as needed, optimizes the information as broadcasting data, and transmits the resultant data to each corresponding broadcast range. That is, the social information multiplexing transmission apparatus 4 multiplexes and transmits the input information in consideration of the broadcasting time of each piece of social information designated to be broadcast by the information transmission management unit 15 and the repetition count within the broadcasting time for each piece of social information. At this time, the input information is preferably transmitted while adjusting the transmission band with the content information such as video data and audio data. In this case, if the broadcasting time of each piece of social information designated by the information transmission management unit 15 and the repetitive count within the broadcasting time for each piece of social information change due to the change of the band, whether to prioritize the broadcasting time or repetition count is preferably selected or determined in advance. Note that a broadcast range is preferably, hierarchically determined like the whole country A, the region B, the city, town, or village C, and the local area D.

The user terminal apparatus 5 is a device capable of determining the current position, such as a navigation device, a smartphone and a PC, which receives at least one broadcast wave registered and set or selected by the user, extracts processable social information from received data, and displays, on a display, part or all of the information by including the relationship between the current position and a position indicated by the information. This allows the user to confirm the position by referring to the displayed information, make a charging reservation, and go to the spot.

Figure 2:
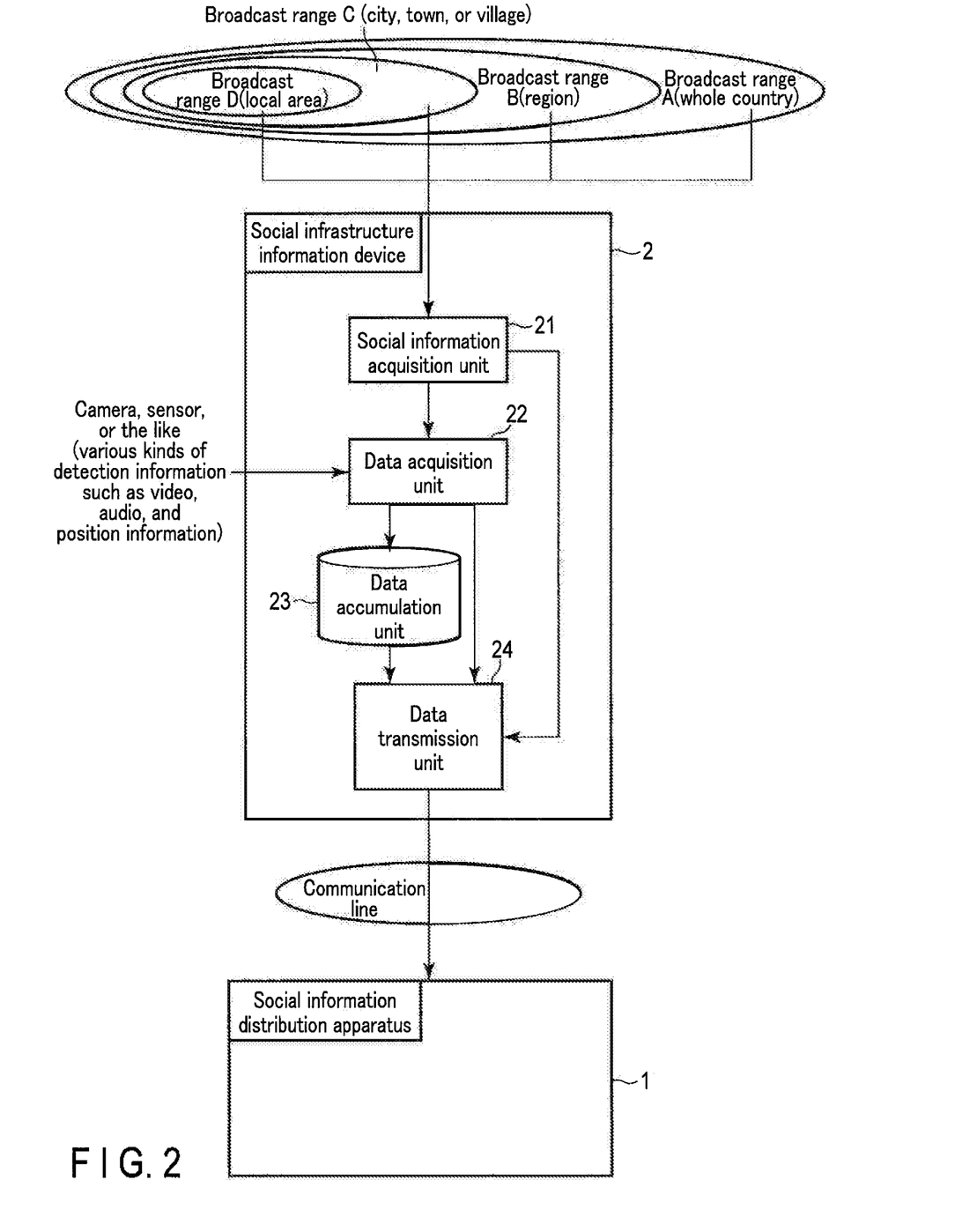
FIG. 2 is a block diagram showing the practical arrangement of a social information device used in the system shown in FIG. 1.

FIG. 2 is a block diagram showing the practical arrangement of the social infrastructure information device 2. Referring to FIG. 2, reference numeral 21 denotes a social information acquisition unit; 22, a data acquisition unit; 23, a data accumulation unit; and 24, a data transmission unit. The data transmission unit 24 has a communication function, and can communicate with the social information distribution apparatus 1 via a communication line (network).

The social information acquisition unit 21 receives at least one broadcast wave, and determines whether data transmitted by the broadcast wave includes data (a range or the like) corresponding to the self device. If such data is included, the social information acquisition unit 21 reads and grasps processing contents to be done by the self device from the data of the received broadcast wave, and sends a processing request to the data acquisition unit 22 and the data transmission unit 24 based on the grasped contents.

The data acquisition unit 22 acquires time-series data (various kinds of detection information such as a video, audio, position information) detected by a camera, a sensor, and the like, processes the acquired data as transmission data to the social information distribution apparatus 1, as needed, and issues the resultant data to the data transmission unit 24. In addition, the data is accumulated in the data accumulation unit 23, as needed. If the social information acquired by the social information acquisition unit 21 includes processing contents destined for the self device, processing such as activation processing, stop processing, and processing of acquiring corresponding data is performed based on an instruction indicated by the processing contents.

The data transmission unit 24 acquires, from the data acquisition unit 22 or the data accumulation unit 23, time-series data to be transmitted, accesses the social information distribution apparatus 1 via the communication line using at least the identification ID individually assigned to the social infrastructure information device 2, and transmits the time-series data to the information acquisition unit 13 of the social information distribution apparatus 1 after authentication. The identification ID of the social infrastructure information device 2 is desirably held in the self device 2 but if it is difficult to hold the identification ID, it may be input every time using an external input module or the like. The data transmission unit 2 converts the data into a transmission format which can be broadcast, such as ISDB-T, ISDB-Tmm, ISDB-S, ISDB-TSB, ATSC, DVB-T, or DTMB, and transmits the converted data. With this processing, it becomes unnecessary to change the broadcast format in the processing of the social information distribution apparatus 1, thereby reducing the processing load.

Note that this embodiment has explained a case in which the social infrastructure information device 2 includes the social information acquisition unit 21. However, a device without the social information acquisition unit 21 is also included.

Figure 3:
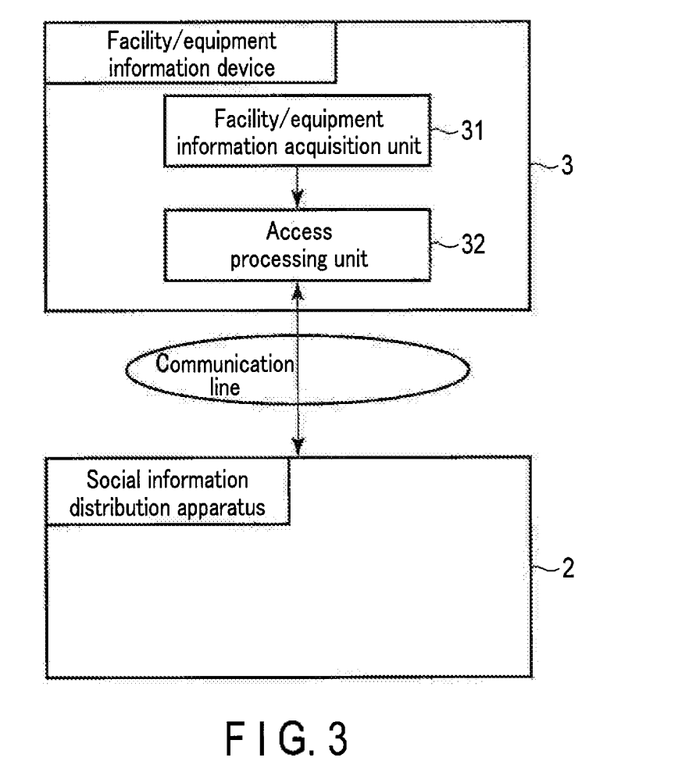
FIG. 3 is a block diagram showing the practical arrangement of a facility/equipment information device used in the system shown in FIG. 1.

FIG. 3 is a block diagram showing the practical arrangement of the facility/equipment information device 3. Referring to FIG. 3, reference numeral 31 denotes a facility/equipment information acquisition unit; and 32, an access processing unit. The facility/equipment information acquisition unit 31 acquires time-series data about a facility/equipment, and the acquired time-series data is sent to the access processing unit 32. The access processing unit 32 serves as an information device such as a PC having a user interface function such as a Web browser, and accesses the social information distribution apparatus 1 via the communication line using at least the identification ID individually assigned to the facility/equipment information device 3. After authentication, in accordance with a procedure provided by the social information distribution apparatus 1, time-series data items and the like are added, changed, or deleted and the resultant data is transmitted to the information acquisition unit 13 of the distribution apparatus 1.

Figure 4:
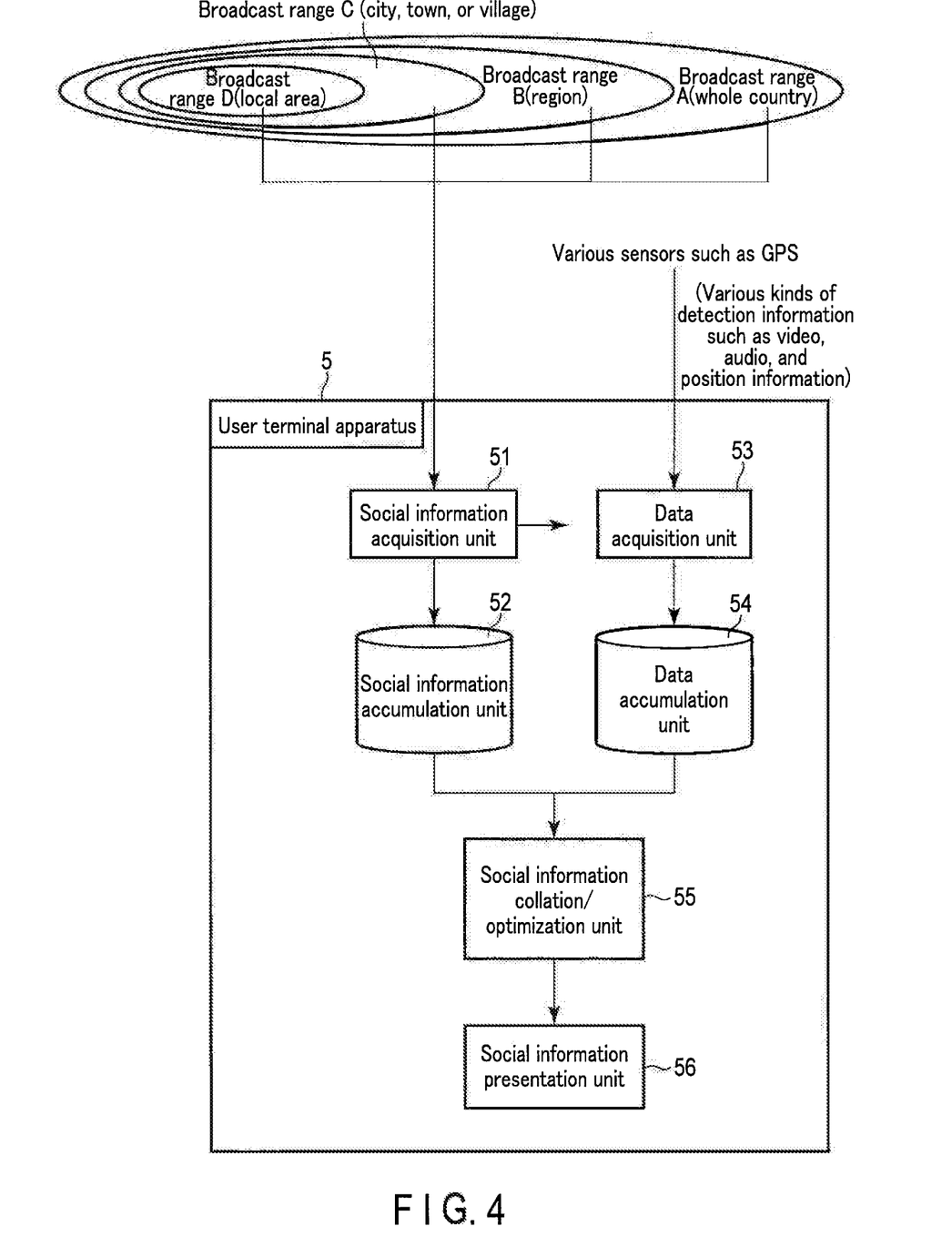
FIG. 4 is a block diagram showing the practical arrangement of a user terminal apparatus shown in FIG. 1.

FIG. 4 is a block diagram showing the practical arrangement of the user terminal apparatus 5. Referring to FIG. 4, the user terminal apparatus 5 includes a social information acquisition unit 51, a social information accumulation unit 52, a data acquisition unit 53, a data accumulation unit 54, a social information collation/optimization unit 55, and a social information presentation unit 56.

The social information acquisition unit 51 receives at least one broadcast wave based on user selection or the settings of the user terminal apparatus 5. Social information processable by the user terminal apparatus 5 in received data of the broadcast wave is saved in the social information accumulation unit 52. At this time, it is preferable to detect in advance what kind of social information is in the received data of the broadcast wave, and save it in the social information accumulation unit 52 based on the selection or settings. Furthermore, a request to acquire corresponding data is sent to the data acquisition unit 53, as needed.

The data acquisition unit 53 acquires data detected by various sensors such as a GPS, processes the data in a format in which it is easy to match the data to social information, as needed, and saves the resultant data in the data accumulation unit. If a request to acquire data about social information is sent from the social information acquisition unit 51, processing of, for example, acquiring corresponding data in accordance with contents is performed.

The social information collation/optimization unit 55 acquires part or all of the information from the social information accumulation unit 52 and the data accumulation unit 54 based on user selection or the settings of the user terminal apparatus 5. Optimization of the social information such as collation of data items, calculation of a difference, and prediction and generation based on the time-series data is performed, and the resultant information is issued to the social information presentation unit 56 at an appropriate timing. At this time, if the information has been encrypted, it is preferably decrypted based on device information of the terminal.

The social information presentation unit 56 issues the social information processed by the social information collation/optimization unit 55 to a presentation apparatus such as a display or loudspeaker.

Examples of the social information providing system having the above-described arrangement will be described below.

First Embodiment

A mobile power supply vehicle use information providing service will be explained as one embodiment. In this embodiment, a mobile power supply vehicle will be referred to as a social infrastructure information device 2.

In a social information distribution apparatus 1, a basic information registration unit 11 acquires in advance basic information of the mobile power supply vehicle 2, and registers the basic information, including a basic position (home), in an information management/accumulation unit 12. At this time, in social information about the mobile power supply vehicle 2, a current position, a waiting time, the number of chargeable vehicles, an estimated sold-out time, and the like are registered as data items of the information which change in time series, and a provider name, a car registration number, a charging type (three-phase 200 V quick charging type or the like), a chargeable time (20 min or the like), the number of vehicles simultaneously charged, a unit price, and a reservation URL (http://xxx/xxxx . . . ) are registered as data items of the information which do not change in time series. The mobile power supply vehicle 2 provides the current position, the waiting time (15 min or the like), the number of chargeable vehicles (45 or the like), and the estimated sold-out time (21:45 or the like) of the time-series data to an information acquisition unit 13 using the identification ID of the mobile power supply vehicle 2 issued at the time of registration.

The information management/accumulation unit 12 accumulates the social information provided from the mobile power supply vehicle 2 together with an acquisition date/time.

An information analysis unit 14 acquires the social information accumulated in the information management/accumulation unit 12 and social information of an external system reserved and managed in the reservation URL, calculates the latest number of chargeable vehicles, predicts, based on the reservation trend, the time at which the number of chargeable vehicles is reached, and updates the social information such as the number of chargeable vehicles and the expected sold-out time in the information management/accumulation unit 12.

Furthermore, the sold-out time at which electricity accumulated in the mobile power supply vehicle is sold out is expected based on surrounding road conditions accumulated in the information management/accumulation unit 12 or managed by the external system.

A road congestion status is different depending on the moving route of the user, and an average speed is also largely different. Therefore, the information analysis unit 14 acquires the road conditions of expressways, national roads, prefectural roads, local roads to obtain an estimated combination of roads, and determines, based on a fine analysis result as much as possible, for each road of the combination, a geographic position where the user can arrive before the estimated sold-out time, thereby broadcasting the information by setting the position as an geographic area. In this case, if the vehicle smoothly moves at high speed, a broadcast in a significantly wide area is possible.

An information transmission management unit 15 determines items to be broadcast and a broadcast order for the social information accumulated in the information management/accumulation unit 12, like the position information, provider name, car registration number (1234 or the like), current position, waiting time (15 min or the like), charging type (three-phase 200 V quick charging type or the like), chargeable time (20 min or the like), unit price (500 yen or the like), the number of chargeable vehicles (45 or the like), the number of vehicles simultaneously charged (5 or the like), expected sold-out time (21:45 or the like), and reservation URL (http://xxx/xxxx . . . or the like). Based on information of the geographic area analyzed by the information analysis unit 14, a broadcast range (area) at the time of a broadcast is determined. In addition, the broadcasting time (the current time to 21:40, 5-min update, and the like) and the repetition count (undesignated (as large as possible within the broadcast band/time) or the like) within the broadcasting time are determined. The thus determined information is designated to a transmission information generation unit 16 and a social information multiplexing transmission apparatus 4, thereby requesting processing.

Upon accepting the designation and request from the information transmission management unit 15, the transmission information generation unit 16 extracts corresponding information from the information management/accumulation unit 12, discriminates data to be transmitted between data for a car navigation device, data for a smartphone, data for a PC, and the like in accordance with the types of user terminal apparatus, and converts the data into that appropriate for each user terminal apparatus to generate broadcasting data. In this embodiment, since the transmission data are at the same level and user terminal apparatuses 5 are at the same level, it is not necessary to form a hierarchy of broadcast ranges. The broadcasting data preferably has, for example, a format complying with MPEG-2 System (ITU-T H.222.0|ISO/IEC 13818-1), a format complying with FLUTE (File Delivery over Unidirectional Transport (RFC 3926)), a format complying with the ARIB standard, or the like.

Upon accepting the designation and request from the information transmission management unit 15, the social information multiplexing transmission apparatus 4 selects information necessary for each broadcast range from the social information generated by the transmission information generation unit 16, and performs multiplexing by including broadcasting data such as video data and audio data, as needed. For each broadcast range, the social information multiplexing transmission apparatus 4 converts the information into a broadcast format which can be broadcast, such as ISDB-T, ISDB-Tmm, ISDB-S, ISDB-TSB, ATSC, DVB-T, or DTMB, and transmits the converted information. At the time of transmission, during the broadcasting time of the broadcast social information designated by the information transmission management unit 15, multiplexing and transmission are performed in consideration of the repetition count within the broadcasting time for each piece of social information. Note that transmission is preferably performed while adjusting the band with the broadcasting data such as video data and audio data.

In this case, if the broadcasting time of each piece of social information designated by the information transmission management unit 15 and the repetitive count within the broadcasting time for each piece of social information change due to the change of the band along with an increase in amount of transmission information in case of an emergency, whether to prioritize the broadcasting time or repetition count is preferably selected every time or determined in advance.

The user terminal apparatuses 5 include a car navigation device, smartphone, and PC. Each user terminal apparatus 5 receives at least one broadcast wave registered and set or selected by the user, extracts processable social information from received data, and displays part or all of the information. This allows the user to confirm the position by referring to the displayed information, make a charging reservation, and go to the spot.

This first embodiment has exemplified the mobile power supply vehicle. By accumulating various kinds of information together with the current position from a moving vehicle, analyzing past information to latest information in accordance with a use application, optimizing an analysis result into information expected to be desired by the user, and timely transmitting the information to a necessary area, it can be expected to improve the convenience, and provide an appropriate guidance, thereby improving the social efficiency. Furthermore, since the transmission format is a broadcast, a number of users can simultaneously use information regardless of restrictions on a communication line and equipment.

Second Embodiment

A charging station use information providing service will be described according to the second embodiment. In this embodiment, a charging station will be referred to as a facility/equipment information device 3.

In a social information distribution apparatus 1, a basic information registration unit 11 acquires in advance basic information of the charging station 3 serving as a facility/equipment information device, and registers the basic information in an information management/accumulation unit 12 together with position information. At this time, in social information about the charging station 3, a waiting time is registered as a data item of the information which changes in time series, and a provider name, business hours (24 hours or the like), a charging type (three-phase 200 V quick charging type or the like), a chargeable time (20 min or the like), the number of vehicles simultaneously charged (10 or the like), a unit price (500 yen or the like), and a reservation URL (http://xxx/xxxx . . . ) are registered as data items of the information which do not change in time series. The charging station 3 provides the waiting time (5 min or the like) of the time-series data to an information acquisition unit 13 using the identification ID of the charging station 3 issued at the time of registration.

The information management/accumulation unit 12 accumulates the social information provided from the charging station 3 together with an acquisition date/time.

An information analysis unit 14 expects the sold-out time based on surrounding road conditions accumulated in the information management/accumulation unit 12 or managed by an external system, and specifies a geographic area where the user is expected to be able to arrive before the expected sold-out time.

If, for example, the user moves on an expressway by car from Tokyo to Osaka, he/she can grasp in advance the positions of power supply stations capable of supplying power.

An information transmission management unit 15 determines items to be broadcast and a broadcast order from the social information accumulated in the information management/accumulation unit 12, like the position information, provider name, waiting time (5 min or the like), charging type (three-phase 200 V quick charging type or the like), chargeable time (20 min or the like), unit price (500 yen or the like), the number of vehicles simultaneously charged (10 or the like), business hours (24 hours or the like), and reservation URL (http://xxx/xxxx . . . ). Especially, a broadcast range (area) within which the information is to be broadcast is determined from a geographic area which may be used by the user. The broadcasting time (24 hours, 5-min update, and the like) and the repetition count (undesignated (as large as possible within the broadcast band/time)) within the broadcasting time are determined, and designated to a transmission information generation unit 16 and a social information multiplexing transmission apparatus 4, thereby requesting processing.

Upon accepting the designation and request from the information transmission management unit 15, the transmission information generation unit 16 extracts corresponding data from the information management/accumulation unit 12. The transmission information generation unit 16 discriminates the data to be transmitted between data for a car navigation device, data for a smartphone, data for a PC, and the like in accordance with the types of user terminal apparatuses, and converts the data into that appropriate for each user terminal apparatus to generate broadcasting data. In this embodiment as well, since the transmission data are at the same level and the user terminal apparatuses are at the same level, it is not necessary to form a hierarchy of broadcast ranges. The broadcasting data preferably has, for example, a format complying with MPEG-2 System (ITU-T H.222.0|ISO/IEC 13818-1), a format complying with FLUTE (File Delivery over Unidirectional Transport (RFC 3926)), a format complying with the ARIB standard, or the like.

Upon accepting the designation and processing request from the information transmission management unit 15, the social information multiplexing transmission apparatus 4 selects information necessary for each broadcast range from the social information generated by the transmission information generation unit 16, and performs multiplexing by including broadcasting data such as video data and audio data, as needed. For each broadcast range, the social information multiplexing transmission apparatus 4 converts the information into a broadcast format which can be broadcast, such as ISDB-T, ISDB-Tmm, ISDB-S, ISDB-TSB, ATSC, DVB-T, or DTMB, and transmits the converted information. At the time of transmission, multiplexing and transmission are performed in consideration of the broadcasting time of the broadcast social information designated by the information transmission management unit 15 and the repetition count within the broadcasting time for each piece of social information. Note that transmission is preferably performed while adjusting the band with the broadcasting data such as video data and audio data. In this case, if the broadcasting time of each piece of social information designated by the information transmission management unit 15 and the repetitive count within the broadcasting time for each piece of social information change due to the change of the band along with an increase in amount of transmission information in case of an emergency, whether to prioritize the broadcasting time or repetition count is preferably selected every time or determined in advance.

Each user terminal apparatus 5 receives at least one broadcast wave registered and set or selected by the user, extracts processable social information from received data, and displays part or all of the information on a display. This allows the user to confirm the position by referring to the displayed information, make a charging reservation, and go to the spot.

The second embodiment has exemplified the charging station. However, with respect to increasing facilities or decreasing social infrastructure or stores in accordance with needs in the future, various kinds of social information are accumulated together with position information and analyzed in accordance with a use application, an analysis result is optimized to information desired by the user, and the information is timely transmitted to a necessary area. This allows the user to take rational action, thereby saving the time, resources, and the like.

Third Embodiment

Evacuation facility information provision will be described as the third embodiment. In this embodiment, an evacuation facility will be referred to as a facility/equipment information device 3.

In a social information distribution apparatus 1, a basic information registration unit 11 acquires in advance basic information of the evacuation facility 3 serving as a facility/equipment information device, and registers the basic information in an information management/accumulation unit 12 together with position information. At this time, in social information about the evacuation facility 3, the current number of evacuees, a facility operation state, evacuee information, the number of urgent injured people, shortage information, and the like are registered as data items of the information which change in time series, and a facility name (Anshin Gakuen high school or the like) and the maximum capacity (1,200 people or the like) are registered as data items of the information which do not change in time series. In addition, PCs (10 PCs/regional household information has been registered, or the like), AEDs (2 AEDs or the like), blankets (1,200 blankets or the like), food (1,200 people/2 meals or the like), evacuation guidance devices (PC vide video guidance devices for leaders, sub-leaders, group leaders, ordinary people, and the like), and medical supplies (class B/2, class C/10, or the like) are also preferably registered as equipment information.

In addition, surveillance cameras of social infrastructure information devices 2 installed in the facility or surveillance cameras of nearby social infrastructure information devices 2 preferably belong to the facility, thereby linking time-series data (real time videos) of the surveillance cameras with each other. The current number of evacuees (952), a facility state (safe: partially collapsed/slightly high density and the like), evacuee information (names/ages and the like), the number of urgent injured people (8 or the like), and shortage information (doctor: 1, nurse: 2, guide sub-leader: 15, blanket: 52, AED battery: 2, water: 2,000 L, and the like) are distributed using the identification ID of the facility/equipment information device 3, which has been issued by the evacuation facility at the time of registration in an information acquisition unit 13, and accumulated in the information management/accumulation unit 12 together with an acquisition date/time.

An information analysis unit 14 preferentially discriminates urgent information such as the number of injured people (8), who need to be urgently treated, from the information accumulated in the information management/accumulation unit 12 and issues the information to a cooperative external system, or acquires information about whether to take measures to arrive at a solution by contact, an expected time, and conditions, and performs update in the information acquisition unit 13 based on the acquired pieces of information. A geographic area which can use the evacuation facility is specified based on the surrounding road conditions. An information transmission management unit 15 determines items to be broadcast and a broadcast order from the information accumulated in the information management/accumulation unit 12. This determination processing is performed based on information of, for example, the position information, maximum capacity (1,200 people), the current number of evacuees (952), facility state (safe: partially collapsed/slightly high density), evacuee information (names/ages), and shortage information (doctor: 1, nurse: 2, guide sub-leader: 15, blanket: 52, AED battery: 2, water: 2,000 L, and the like).

The information transmission management unit 15 determines a broadcast range (area), within which data is to be broadcast, from a geographic area which may be used, also determines a broadcasting time (24 hours, 15-min update) and a repetition count (undesignated (as large as possible within the broadcast band/time)) within the broadcasting time, and designates the pieces of determined information to a transmission information generation unit 16 and a social information multiplexing transmission apparatus 4, thereby request to execute processing.

Upon accepting the designation and request from the information transmission management unit 15, the transmission information generation unit 16 extracts corresponding data from the information management/accumulation unit 12, discriminates data to be transmitted between data for a smartphone, data for a PC, and the like in accordance with the types of user terminal apparatuses, and converts the data into that appropriate for each user terminal apparatus to generate broadcasting data. In this embodiment, as the transmission data, the evacuee information (names/ages and the like), the number of urgent injured people, and shortage information are preferably formed into a hierarchy to generate broadcasting data in a format corresponding to the conditions of each user terminal apparatus.

The broadcasting data preferably has, for example, a format complying with MPEG-2 System (ITU-T H.222.0|ISO/IEC 13818-1), a format complying with FLUTE (File Delivery over Unidirectional Transport (RFC 3926)), a format complying with the ARIB standard, or the like.

Upon accepting the designation and request from the information transmission management unit 15, the social information multiplexing transmission apparatus 4 selects information necessary for each broadcast range from the social information generated by the transmission information generation unit 16, and performs multiplexing by including broadcasting data of a surveillance camera in the facility or a nearby linked surveillance camera, as needed, thereby transmitting the information to each broadcast range. The information is converted into a transmission format which can be broadcast, such as ISDB-T, ISDB-Tmm, ISDB-S, ISDB-TSB, ATSC, DVB-T, or DTMB, and then transmitted. At the time of transmission, multiplexing and transmission are performed in consideration of the broadcasting time of the broadcast social information designated to be broadcast by the information transmission management unit 15 and the repetition count within the broadcasting time for each piece of social information. Note that transmission is preferably performed while adjusting the band with the broadcasting data such as video data and audio data. In this case, if the broadcasting time of each piece of social information designated by the information transmission management unit 15 and the repetitive count within the broadcasting time for each piece of social information change due to the change of the band along with an increase in amount of transmission information in case of an emergency, whether to prioritize the broadcasting time or repetition count is preferably selected every time or determined in advance.

Each user terminal apparatus 5 receives at least one broadcast wave registered and set or selected by the user, extracts processable social information from received data, and displays part or all of the information. This allows the user to confirm the position by referring to the displayed information, grasps in advance information of the evacuation facility, and go to the spot. In addition, an application is possible in which family information is set in the user terminal apparatus 5, and if a corresponding person is in the evacuee information, the user is notified of it. The user terminal apparatus 5 can also acquire and browse the number of urgent injured people and shortage information in accordance with a user designation input or advance condition settings.

Note that since demand for evacuation facility information in this embodiment increases in case of an emergency, the load of a communication line is assumed to be temporarily very high. In consideration of this, it is desirable to prioritize communication (in this example, time-series information) between each evacuation facility and a center for managing information of each evacuation facility over communication by general users. On the other hand, in this embodiment, since evacuation facility information is provided in a broadcast format, the general users can obtain the evacuation facility information without using the communication line, and this embodiment can thus contribute to reduction in load of the communication line. Furthermore, people in charge of an emergency who are scattered and work in a wide area can quickly acquire information of each evacuation facility, and can thus take rational action, thereby saving labor, time, and the like.

Fourth Embodiment

Evacuation guidance information provision will be described as the fourth embodiment. In this embodiment, a seismometer, thermometer, rainfall and water-level telemeter, surveillance camera, disaster prevention speaker, evacuation guidance street panel, and the like will be collectively referred to as social infrastructure information devices 2.

In a social information distribution apparatus 1, a basic information registration unit 11 acquires in advance basic information of the social infrastructure information device 2 (a seismometer, thermometer, rainfall and water-level telemeter, surveillance camera, disaster prevention speaker, evacuation guidance street panel, or the like), and registers the basic information in an information management/accumulation unit 12 together with position information of each device. At this time, in social information about an evacuation guidance 3, information (a seismic intensity, temperature, rainfall, water level, or surveillance video) detectable by each device and the presence/absence of a power supply (OK, absence/battery being operating) are registered as data items of the information which change in time series, and a management number, acquired data classification, the operating time by the battery, and the like are registered as data items of the information which do not change in time series. Basic information of the facility/equipment information device 3 in the evacuation area is acquired, and registered together with position information. The data which change in time series and the data which do not change in time series may be registered as in the third embodiment. However, in the case of a facility such as a park, only minimum information (an evacuation area name, currently safe, about 600 evacuees, and the like) may be registered. Pieces of information from various social infrastructure information devices 2 and various facility/equipment information devices 3 are accumulated in the information management/accumulation unit 12 together with an acquisition date/time.

An information analysis unit 14 analyzes the properties of the evacuation guidance from the information accumulated in the information management/accumulation unit 12, and further acquires necessary information of an external system in accordance with the properties. For example, when a tsunami will occur, compound information such as an estimated height, estimated arrival time, temperature sensor, surveillance camera video, reported fire, and road passability/impassability information is acquired and analyzed to specify an optimum guidance route to an evacuation area corresponding to a user position, thereby accumulating it in the information management/accumulation unit 12.

An information transmission management unit 15 determines items to be broadcast and a broadcast order from the information accumulated in the information management/accumulation unit 12, like the position information, evacuation area name, and guidance route. In addition, a broadcast range (area) within which information is to be broadcast is determined from a geographic area which may be used. A broadcasting time (24 hours, 1-min update, and the like) and a repetition count (undesignated (as large as possible within the broadcast band/time)) within the broadcasting time are determined, and the determined contents are designated to a transmission information generation unit 16 and a social information multiplexing transmission apparatus 4, thereby requesting execution.

Upon accepting the designation and request from the information transmission management unit 15, the transmission information generation unit 16 extracts corresponding data from the information management/accumulation unit 12, discriminates the data to be transmitted between data for a social information device, data for a car navigation device, data for a smartphone, data for a PC, and the like in accordance with the types of user terminal apparatuses, and converts the data into that appropriate for each user terminal apparatus to generate broadcasting data.

The broadcasting data preferably has, for example, a format complying with MPEG-2 System (ITU-T H.222.0|ISO/IEC 13818-1), a format complying with FLUTE (File Delivery over Unidirectional Transport (RFC 3926)), a format complying with the ARIB standard, or the like.

Upon accepting the designation and request from the information transmission management unit 15, the social information multiplexing transmission apparatus 4 selects information necessary for each broadcast range from the social information generated by the transmission information generation unit 16, and performs multiplexing by including broadcasting data of a surveillance camera in a facility or a nearby linked surveillance camera, as needed, thereby transmitting the information to each broadcast range. The information is converted into a transmission format which can be broadcast, such as ISDB-T, ISDB-Tmm, ISDB-S, ISDB-TSB, ATSC, DVB-T, or DTMB, and then transmitted. At the time of transmission, multiplexing and transmission are performed in consideration of the broadcasting time of the broadcast social information designated by the information transmission management unit 15 and the repetition count within the broadcasting time for each piece of social information. Note that transmission is preferably performed while adjusting the band with the broadcasting data such as video data and audio data. In this case, if the broadcasting time of each piece of social information designated by the information transmission management unit 15 and the repetitive count within the broadcasting time for each piece of social information change due to the change of the band along with an increase in amount of transmission information in case of an emergency, whether to prioritize the broadcasting time or repetition count is preferably selected every time or determined in advance.

Each of the disaster prevention speaker and the evacuation guidance street panel desirably receives a broadcast wave from the distribution apparatus 1, and acquires evacuation guidance information corresponding to an installation position to provide an optimum guidance. Each user terminal apparatus 5 receives at least one broadcast wave registered and set or selected by the user, extracts processable social information from received data, and displays part or all of the information on a display. This allows the user to evacuate in accordance with the evacuation guidance information displayed on the display. Furthermore, the user can determine an evacuation route in the field using the user terminal apparatus 5 based on the current position and the guidance information provided by the broadcast wave.

This embodiment has exemplified an evacuation guidance based on a result of analyzing compound time-series information and the like based on various social information devices. A social information device for transmitting information to evacuees, such as a disaster prevention speaker or evacuation guidance street panel, can provide an optimum evacuation guidance in its location by receiving social information provided over a broadcast wave. Even a general user who does not know an evacuation area can readily know it. A general user who knows an evacuation area can arrive at the evacuation area by avoiding a route which he/she must not go. As described above, the user can save labor, time, and the like, thereby improving safety in terms of various aspects.

Figure 5:
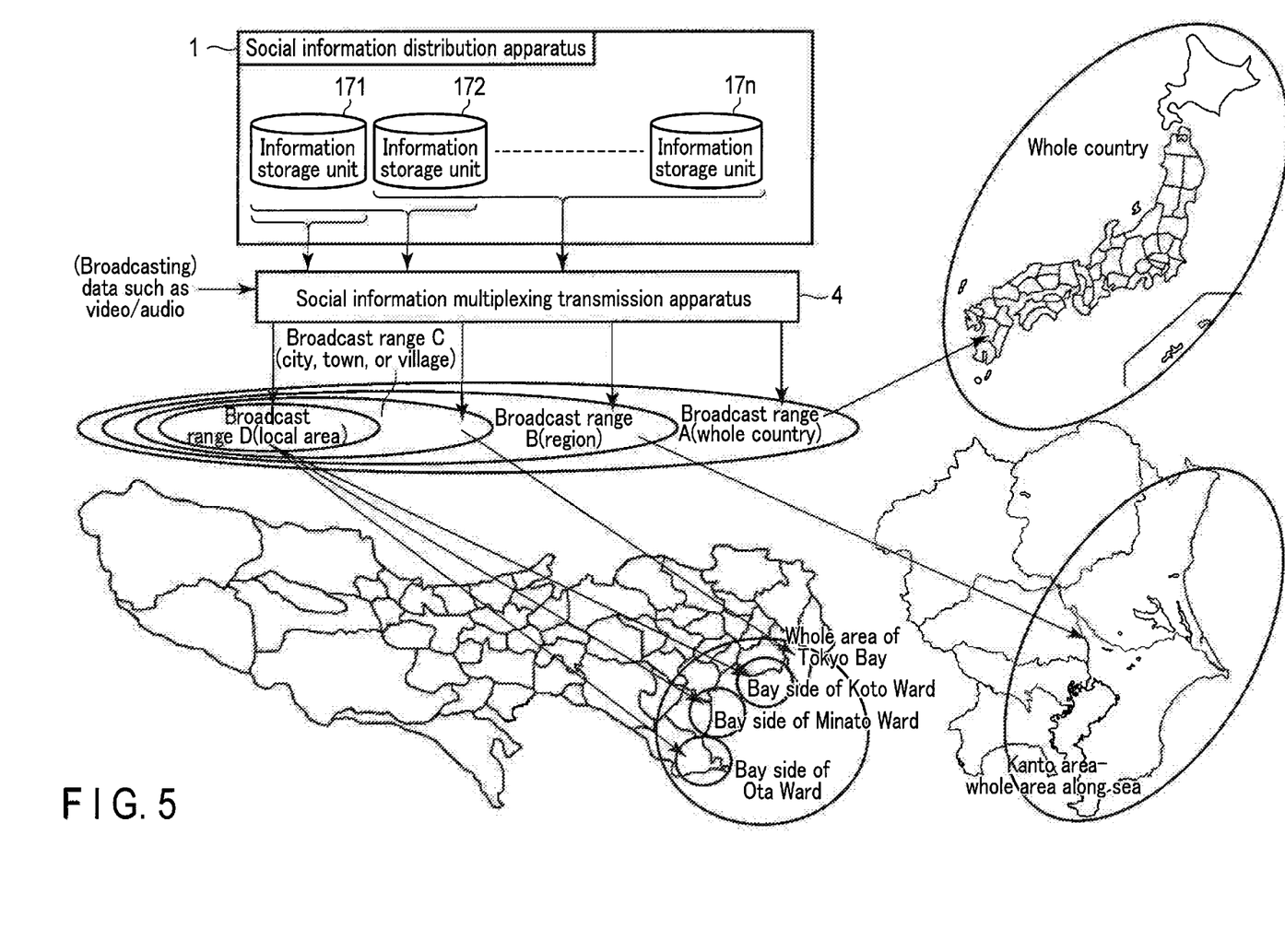
FIG. 5 is a schematic view showing an example of division of broadcast ranges in the system shown in FIG. 1.

It is possible to more appropriately provide an evacuation guidance by appropriately selecting division of broadcast ranges. For example, assuming that an earthquake has occurred in Tokyo Bay, compound information such as time-series data from the social infrastructure information devices 2 and facility/equipment information devices 3 installed in respective locations and information of an external system are acquired, the contents are discriminated for each broadcast range to transmit an optimum guidance route to an evacuation area corresponding to a user position. FIG. 5 shows an example. Referring to FIG. 5, a broadcast range A indicates the whole of Japan; a broadcast range B, an entire area along the sea in the Kanto area; a broadcast range C, an area around Tokyo Bay; and broadcast ranges D, an area on the bay side of Koto Ward, an area on the bay side of Minato Ward, and an area on the bay side of Ota Ward, respectively.

In the above example, the height of a tsunami of 10 m, an expected arrival time of 10:22, an effective evacuation area information (including position information) for each position information area (obtained by subdividing a broadcast range in accordance with a user position), and evacuation information of an optimum evacuation route are transmitted to user terminal apparatuses the small area on the bay side of Ota Ward, and evacuation information for a disaster prevention speaker and an evacuation guidance street panel for each position information area (obtained by subdividing the broadcast range in accordance with the user position) is also transmitted. In Minato Ward and Koto Ward as well, evacuation information corresponding to a broadcast range is transmitted. The user can receive a broadcast in the small area using a user terminal apparatus, and acquire information from a disaster prevention speaker and evacuation guidance street panel, thereby optimally evacuating by avoiding a risk and congestion timely and practically.

In a broadcast in the whole area of Tokyo Bay, ship guidance information, vehicle guidance road information, and the like are effective in addition to the height and expected arrival time of a tsunami. As these pieces of information, information for each social information device linked with the identification ID of the social infrastructure information device 2 is transmitted. For example, in the case of a disaster prevention speaker, audio information suitable for an installation location is transmitted, or a plurality of pieces of audio information are accumulated in advance on the disaster prevention speaker side and information for selecting and instructing one piece of audio information to be output from the disaster prevention speaker is transmitted. Similarly, as for the evacuation guidance street panel, video information suitable for an installation location is transmitted, or a plurality of pieces of video information may be accumulated in advance on the street panel side and information for selecting and instructing one piece of video information to be displayed on the evacuation guidance street panel may be transmitted.

In a broadcast in the whole area along the sea in the Kanto area, a seismic intensity and aftershock predication information of each area, transportation operation information of trains and the like, evacuation/safety information and, if necessary, evacuation necessity information for each position information area (obtained by subdividing a broadcast range in accordance with a user position), evacuation facility information, and evacuee information as well as information for each social information device linked with the identification ID of the social information device are transmitted. In addition, rescue contents, position information, necessary equipment, and the like are preferably transmitted as information for rescuers.

In a broadcast in the whole country, information for each social information device linked with the identification ID of the social information device such as evacuation/safe information is transmitted in addition to a seismic intensity and aftershock predication information of each area, road information, and transportation operation information of trains, planes, and the like. Rescue contents, position information, necessary equipment, and the like are preferably transmitted as information for rescuers outside a disaster-stricken area. As described above, by classifying and broadcasting optimum information at this point of time in each range, the user can quickly take timely action at any position, thereby improving the efficiency of an evacuation guidance.

Figure 6:
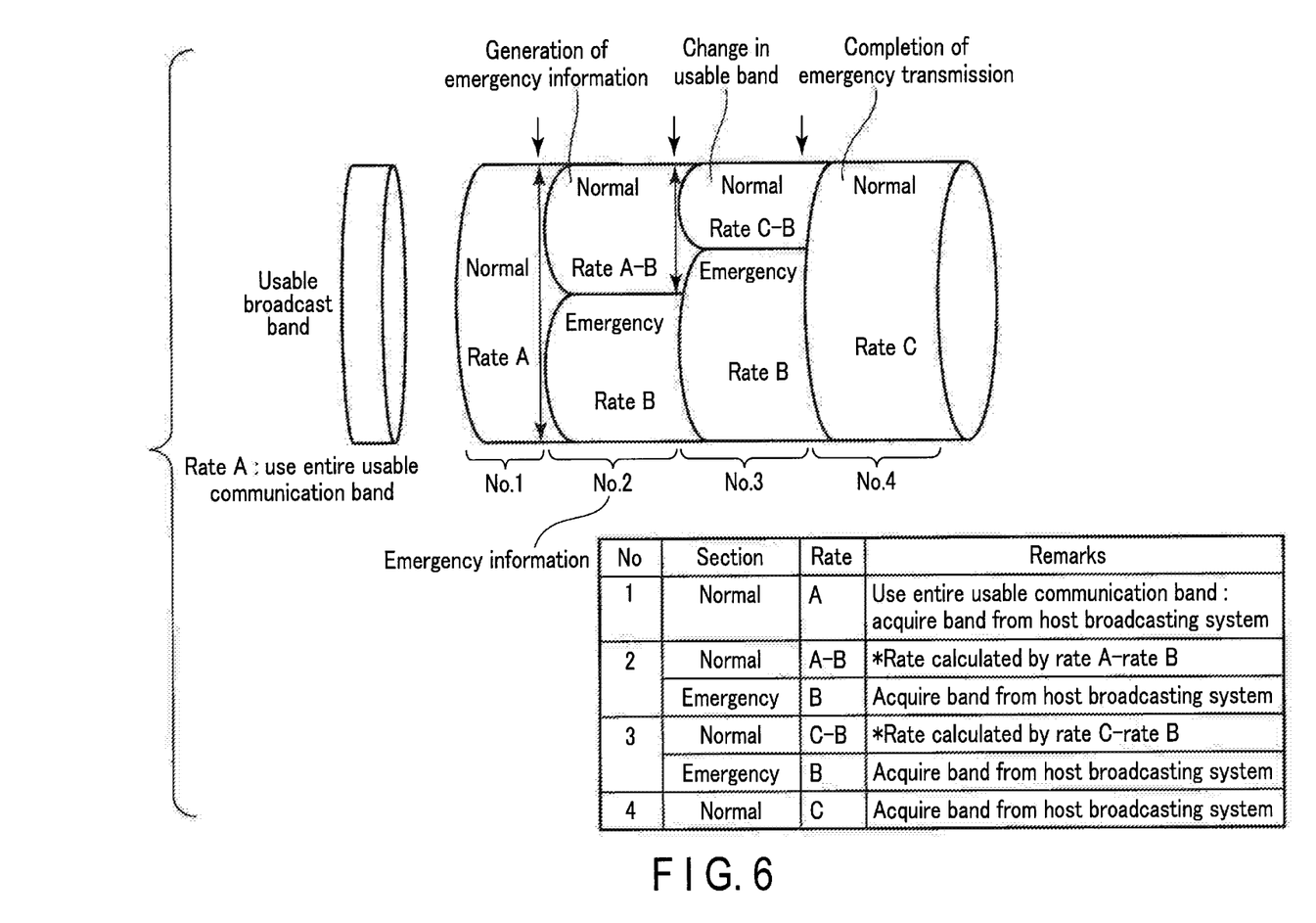
FIG. 6 is a view showing use examples of a communication band in the system shown in FIG. 1 in a normal state and in a state in which emergency information is generated.

If an emergency transmission request like emergency evacuation information is received, an emergency data rate is ensured, and then a normal data rate is calculated based on the entire usable communication band, thereby changing the normal data rate in accordance with the information amount of emergency information, as shown in FIG. 6. The band control for information is performed by weighting information to be transmitted. Assume that the amount of emergency information is large. In this case, if normal information transmission is suddenly limited, the user may become confused, and thus the normal data rate is gradually limited in accordance with the information amount.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A social information distribution apparatus configured to collect and analyze social information transmitted from each of one or more evacuation facilities, and distribute the social information over a broadcast wave, the social information distribution apparatus comprising:
   a basic information collector implemented by one or more hardware processors and configured to collect basic information comprising at least one of a position, a facility name, or a maximum capacity of each of the one or more evacuation facilities;
   an accumulator implemented by the one or more hardware processors and configured to apportion and accumulate, for items classified in advance, the basic information of each of the one or more evacuation facilities collected by the basic information collector and the social information transmitted in time series from each of the one or more evacuation facilities, and read out and output requested information, the social information comprising at least one of a current number of evacuees, a facility operation state, evacuee information, a number of urgent injured people, shortage information, a number of information processing terminals, a number of automated external defibrillators (AEDs), a number of blankets, food availability, a number of evacuation guidance devices, or a number of medical supplies;
   an information transmission management system implemented by the one or more hardware processors and configured to determine, as broadcast items and a broadcast order for the social information accumulated in the accumulator, at least one of the position information, the maximum capacity, the current number of evacuees, the facility operation state, the evacuee information, or the shortage information, determine a broadcast range, within which the broadcast items are to be broadcast, from a geographic area capable of using the one or more evacuation facilities, and determine a broadcasting time and a repetition count within the broadcasting time; and
   a social information transmitter configured to transmit the broadcast items to substantially the entire broadcast range over the broadcast wave in accordance with the broadcasting time and the repetition count,
   wherein the repetition count within the broadcasting time changes due to a change of band for broadcasting.

2. The social information distribution apparatus of claim 1, further comprising an analyzer implemented by the one or more hardware processors and configured to analyze, based at least in part on the social information accumulated in the accumulator, at least one of determination of the number of urgent injured people, discrimination of urgent priority information, specification of the geographic area capable of using the one or more evacuation facilities based at least in part on a surrounding road condition, acquisition of information about whether to take measures to arrive at a solution by issuance to or contact with a cooperative external system and the solution's expected time and condition, or specification of the geographic area capable of using the one or more evacuation facilities based at least in part on a surrounding road condition by updating accumulated information in the accumulator.

3. The social information distribution apparatus of claim 1, wherein the social information further comprises social infrastructure information and facility/equipment information.

4. The social information distribution apparatus of claim 3, wherein the social infrastructure information comprises information from at least one of a mobile power supply vehicle, a wattmeter, a power supply station, a thermometer, a seismometer, an ombrometer, a surveillance camera, or a security gate.

5. The social information distribution apparatus of claim 3, wherein the facility/equipment information comprises information from a communication device installed in at least one of a school, a park, a hospital, or an evacuation center.

6. The social information distribution apparatus of claim 1, wherein the information transmission management system further determines a second broadcast range for broadcasting the social information.

7. The social information distribution apparatus of claim 6, wherein the second broadcast range covers a greater geographical area than the broadcast range.

8. The social information distribution apparatus of claim 7, wherein the second broadcast range at least partially overlaps with the broadcast range.

9. The social information distribution apparatus of claim 1, wherein the social information transmitter transmits the social information as video data or audio data.

10. A social information distribution apparatus configured to collect and analyze social information transmitted from each of one or more evacuation guidance devices comprising at least one of a seismometer, a thermometer, a rainfall and water-level telemeter, a surveillance camera, a disaster prevention speaker, or an evacuation guidance street panel, and distribute the social information over a broadcast wave, the social information distribution apparatus comprising:
a basic information collector implemented by one or more hardware processors and configured to collect basic information comprising at least one of a position, a management number, acquired data classification, or an operating duration by a battery of each of the one or more evacuation guidance devices;
an accumulator implemented by the one or more hardware processors and configured to apportion and accumulate, for items classified in advance, the basic information of each of the one or more evacuation guidance devices collected by the basic information collector and the social information transmitted in time series from each of the one or more evacuation guidance devices, and reading out and outputting requested information, the social information comprising at least one of a seismic intensity, a temperature, a rainfall, a water level, a surveillance video, and a presence/absence of power supply;
an information transmission management system implemented by the one or more hardware processors and configured to determine, as broadcast items and a broadcast order for the social information accumulated in the accumulator, the social information about the evacuation guidance including at least one of position information, an evacuation area name, or the guidance route, determine a broadcast range, within which the broadcast items are to be broadcast, from a geographic area capable of using a first one of the one of more evacuation facilities, and determine a broadcasting time and a repetition count within the broadcasting time; and
a social information transmitter configured to transmit the broadcast items to substantially the entire broadcast range over the broadcast wave in accordance with the broadcasting time and the repetition count,
wherein the repetition count within the broadcasting time changes due to a change of band for broadcasting.

11. The social information distribution apparatus of claim 10, further comprising an analyzer implemented by the one or more hardware processors and configured to analyze properties of an evacuation guidance from the social information accumulated in the accumulator, analyze compound information by further acquiring necessary information of an external system in accordance with the properties, specifying an optimum guidance route to an evacuation area corresponding to the position, and accumulate the optimum guidance route in the accumulator.

12. The social information distribution apparatus of claim 10, wherein the social information further comprises social infrastructure information and facility/equipment information.

13. The social information distribution apparatus of claim 12, wherein the social infrastructure information comprises information from at least one of a mobile power supply vehicle, a wattmeter, a power supply station, a thermometer, a seismometer, an ombrometer, a surveillance camera, or a security gate.

14. The social information distribution apparatus of claim 12, wherein the facility/equipment information comprises information from a communication device installed in at least one of a school, a park, a hospital, or an evacuation center.

15. The social information distribution apparatus of claim 10, wherein the information transmission management system further determines a second broadcast range for broadcasting the social information.

16. The social information distribution apparatus of claim 15, wherein the second broadcast range covers a greater geographical area than the broadcast range.

17. The social information distribution apparatus of claim 16, wherein the second broadcast range at least partially overlaps with the broadcast range.

18. The social information distribution apparatus of claim 10, wherein the social information transmitter transmits the social information as video data or audio data.

* * * * *